United States Patent [19]

Carroll et al.

[11] Patent Number: 6,016,507

[45] Date of Patent: Jan. 18, 2000

[54] METHOD AND APPARATUS FOR DELETING A PORTION OF A VIDEO OR AUDIO FILE FROM DATA STORAGE PRIOR TO COMPLETION OF BROADCAST OR PRESENTATION

[75] Inventors: David John Carroll; Wade David Shaw, both of Austin, Tex.

[73] Assignee: International Business Machines Corporation, Armonk, N.Y.

[21] Appl. No.: 08/976,019

[22] Filed: Nov. 21, 1997

[51] Int. Cl.$^7$ ....................................................... H04N 7/10
[52] U.S. Cl. .............................. 709/217; 348/7; 711/101; 711/173
[58] Field of Search ........................ 348/7, 12; 455/4.1, 455/5.2; 395/200.47–200.49; 711/102, 103, 110, 114, 150, 168, 173, 159; 709/217; 710/56–58

[56] References Cited

U.S. PATENT DOCUMENTS

| | | |
|---|---|---|
| 4,636,858 | 1/1987 | Hague et al. . |
| 4,656,528 | 4/1987 | Shichijo et al. . |
| 5,206,907 | 4/1993 | Hashimoto et al. . |
| 5,262,940 | 11/1993 | Sussman . |
| 5,341,474 | 8/1994 | Gelman et al. ........................... 348/10 |
| 5,379,380 | 1/1995 | Mori et al. . |
| 5,489,947 | 2/1996 | Cooper . |
| 5,506,615 | 4/1996 | Awaji ........................................... 348/7 |
| 5,532,828 | 7/1996 | Mitsuse . |
| 5,544,327 | 8/1996 | Dan et al. . |
| 5,572,645 | 11/1996 | Dan et al. . |
| 5,583,573 | 12/1996 | Asamura et al. . |
| 5,682,195 | 10/1997 | Hendricks et al. .......................... 348/6 |
| 5,689,299 | 11/1997 | Isono et al. ................................ 348/12 |
| 5,721,823 | 2/1998 | Chen et al. .................................. 348/7 |
| 5,787,472 | 7/1998 | Dan et al. .................................... 348/7 |
| 5,802,284 | 9/1998 | Karlton et al. ............................ 348/12 |
| 5,815,662 | 9/1998 | Ong ............................................. 348/7 |

*Primary Examiner*—Andrew I. Faile
*Assistant Examiner*—Reuben M. Brown
*Attorney, Agent, or Firm*—Leslie A. Van Leeuwen; Brian F. Russell; Andrew J. Dillon

[57] ABSTRACT

An audio-video broadcast apparatus has non-volatile data storage that contains a file which includes at least one of audio and video data. In addition, the audio-video broadcast apparatus has an audio-video server coupled to the non-volatile data storage. The audio-video server broadcasts contents of the file and causes the non-volatile storage to delete a portion of the file from the non-volatile storage prior to the audio-video server broadcasting all of the contents of the file. In this manner, the amount of required non-volatile storage may be greatly reduced.

27 Claims, 5 Drawing Sheets

METHOD AND APPARATUS FOR DELETING A PORTION OF A VIDEO OR AUDIO FILE FROM DATA STORAGE PRIOR TO COMPLETION OF BROADCAST OR PRESENTATION

BACKGROUND OF THE INVENTION

1. Technical Field

The present invention relates in general to a data processing and, in particular, to a method and system for the broadcast and presentation of audio and video data. Still more particularly, the present invention relates to a method and system for efficiently managing the storage of audio and video data in broadcast and presentation environments.

2. Description of the Related Art

In the audio and video broadcast industry, which includes conventional television and radio broadcasting as well as emerging multicast technology for broadcasting audio and video across communication networks, programming is generally established well in advance of actual broadcast. In such broadcast environments, each file, which may represent a television program or song, is typically loaded onto a disk drive according to a predetermined broadcast schedule and then deleted from the disk drive after all of the contents of the file have been broadcast.

A chief problem with these broadcast environments is the large amount of storage required to store audio and video files in digital format. For example, a typical audio file (e.g., a song) may require 5 Megabytes (MB) of storage, while a one hour television may require 2 Gigabytes (GB) of storage. Storing a significant amount of programming in advance of programming thus requires large disk drives, anywhere from 50 Gigabytes to over 1 Terabyte in size.

It should therefore be apparent that a method and system are needed for efficiently managing the storage of audio and video data in a broadcast environment.

SUMMARY OF THE INVENTION

It is therefore one object of the present invention to provide an improved method and system for data processing.

It is another object of the present invention to provide an improved method and system for the broadcast and presentation of audio and video data.

It is yet another object of the present invention to provide a method and system for efficiently managing the storage of audio and video data in broadcast and presentation environments.

The foregoing objects are achieved as is now described. An audio-video broadcast apparatus has non-volatile data storage that contains a file which includes at least one of audio and video data. In addition, the audio-video broadcast apparatus has an audio-video server coupled to the non-volatile data storage. The audio-video server broadcasts contents of the file and causes the non-volatile storage to delete a portion of the file from the non-volatile storage prior to the audio-video server broadcasting all of the contents of the file. In this manner, the amount of required non-volatile storage may be greatly reduced.

In a second embodiment, a data presentation system includes non-volatile data storage that stores a file that contains at least one of audio and video data. The data presentation apparatus further includes a presentation device, means for causing the presentation device to present contents of the file, and means for causing the non-volatile storage to delete a portion of the file from the non-volatile storage prior to the presentation device presenting all of the contents of the file.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
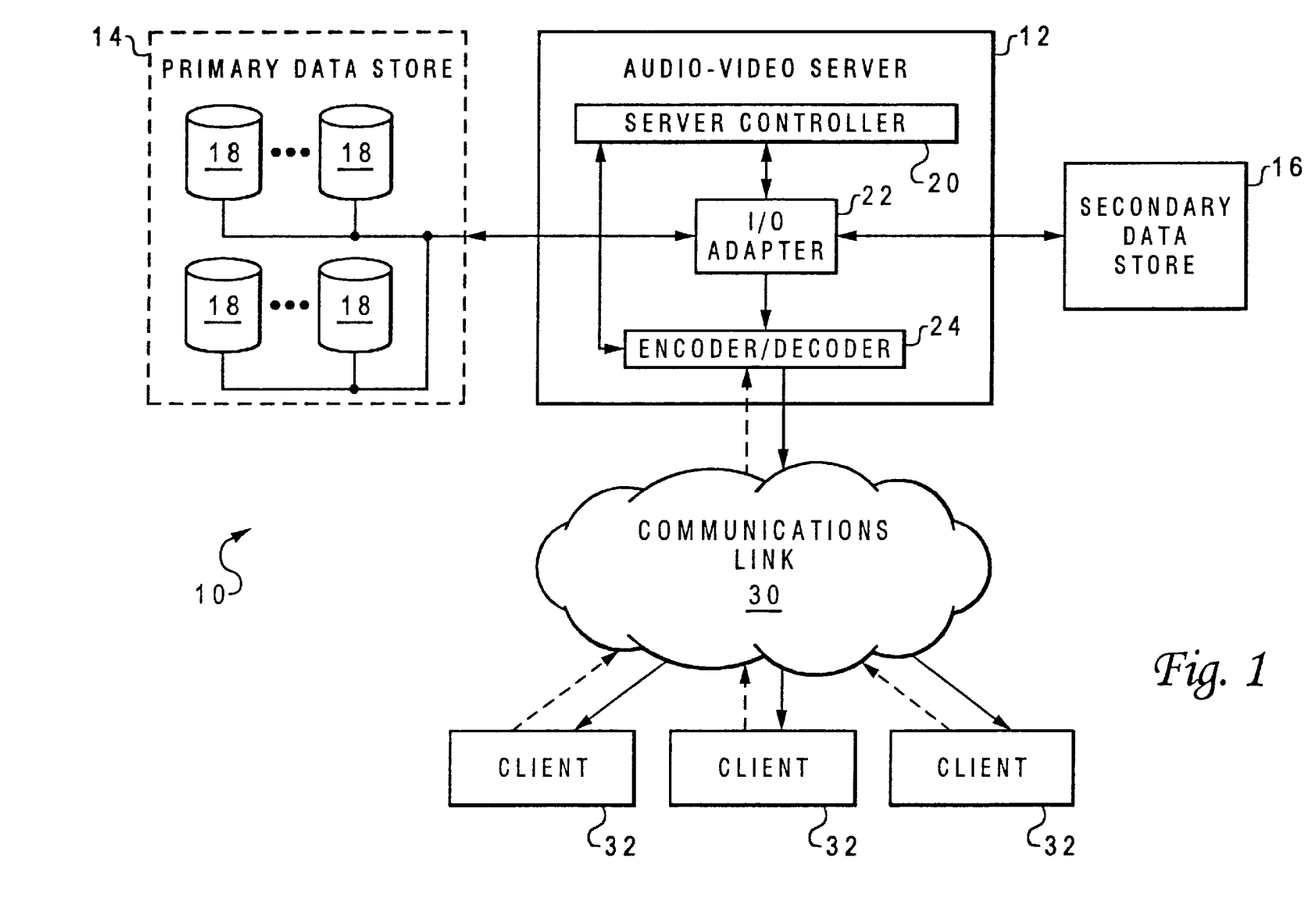
FIG. 1 depicts an illustrative embodiment of an audio-video broadcast apparatus with which the present invention may advantageously be utilized.

With reference now to the figures and in particular with reference to FIG. 1, there is depicted an illustrative embodiment of an audio-video broadcast environment within which the present invention may advantageously be utilized. As illustrated, on the broadcast side, audio-video broadcast environment 10 includes an audio-video server 12, which is coupled to a primary data store 14 and a secondary data store 16. In the depicted embodiment, primary data store 14 provides high speed digital data storage and includes one or more magnetic or optical disks 18. In contrast, secondary data store 16 is a relatively slow archival storage device such as a magnetic or digital tape drive having an associated tape library. Secondary data store 16 may contain hundreds or thousands of hours of video and/or audio programming.

Audio-video server 12 includes a server controller 18, which, in response to a predetermined broadcast schedule, causes input/output (I/O) adapter 22 to instruct secondary data store 16 to output one or more files corresponding to television programs, songs, or other audio and/or video programming specified in the broadcast schedule. The audio and/or video files output by secondary data store 16 are then stored within primary data store 14 according to a selected file system. Again according to the broadcast schedule, server controller 20 causes I/O adapter 22 to begin retrieving from primary data store 14 the contents of a selected file to be broadcast. As it receives the contents of the selected file, I/O adapter 22 outputs the contents of the file to communications link 30 after the contents have optionally been encoded and/or decoded by encoder/decoder 24. The encoding and decoding functions performed on broadcast data by encoder/decoder 24 can include compressing or decompressing the data, encrypting the data, and/or formatting the data in accordance with the communication protocol utilized by communications link 30. Broadcast data transmitted across communications link 30 is received by one or more clients 32, which comprise data presentation devices that present the broadcast audio and/or video data to an end user. As described in greater detail infra, according to the present invention portions of an audio or video file that have been broadcast by audio-video server 12 can be deleted from primary data store 14 before all of the contents of the file are broadcast so that the storage capacity of primary data store 14 is efficiently utilized.

The generalized audio-video broadcast environment 10 described supra is applicable to a number of specific broadcast environments. For example, in a first embodiment in which audio-video server 12 broadcasts video and audio data representing, for example, television programs or movies, communications link 30 is an atmospheric high frequency (e.g., UHF or VHF) antenna-to-antenna link that conforms with the NTSC, PAL, SECAM, or other standard for such broadcasts. In this first embodiment, clients 32 would typically each comprise a television set coupled to an antenna or satellite receiver, and audio-video server 12 would comprise a general-purpose or special-purpose computer. As such, audio-video server 12 could implement server controller 20 and encoder/decoder 24 utilizing either hardware or broadcast software or a combination of both. Encoder/decoder 24, in addition to its other possible functions, would convert the broadcast data from digital to analog format.

In a second embodiment in which audio-video server 12 broadcasts only audio data representing, for example, music, communications link 30 is an atmospheric radio frequency (RF) antenna-to-antenna link that utilizes either frequency modulation (FM) or amplitude modulation (AM) of a carrier frequency to convey the broadcast data. In this second embodiment, clients 32 would typically each comprise an RF receiver coupled to an antenna, and audio-video server 12 would comprise a general-purpose or special-purpose computer like that described above with respect to the first embodiment.

In yet another embodiment, communications link 30 can comprise a computer or telephone network that utilizes a selected communication protocol to convey broadcast data in digital format between audio-video server 12 and clients 32. Such communication can be realized utilizing commercially available multicast software running on audio-video server 12, which is preferably a general-purpose workstation computer, such as the RS/6000 manufactured by International Business Machines Corporation. In this third embodiment, clients 32 can be implemented with general-purpose computers running data presentation software, or alternatively, as conventional television sets coupled to WebTV set-top boxes. Of course, the quality of the video and audio data broadcast across communications link 30 is dependent upon the bandwidth of the underlying physical connection. For example, an internet or intranet Transmission Control Protocol/Internet Protocol (TCP/IP) connection can handle data communication at data rates up to 1.5 Mbits/s according to the MPEG-1 standard, while an MPEG-2 transport stream transmitted over an Asynchronous Transfer Mode (ATM) network can achieve data rates of 15 Mbits/s.

Figure 2:
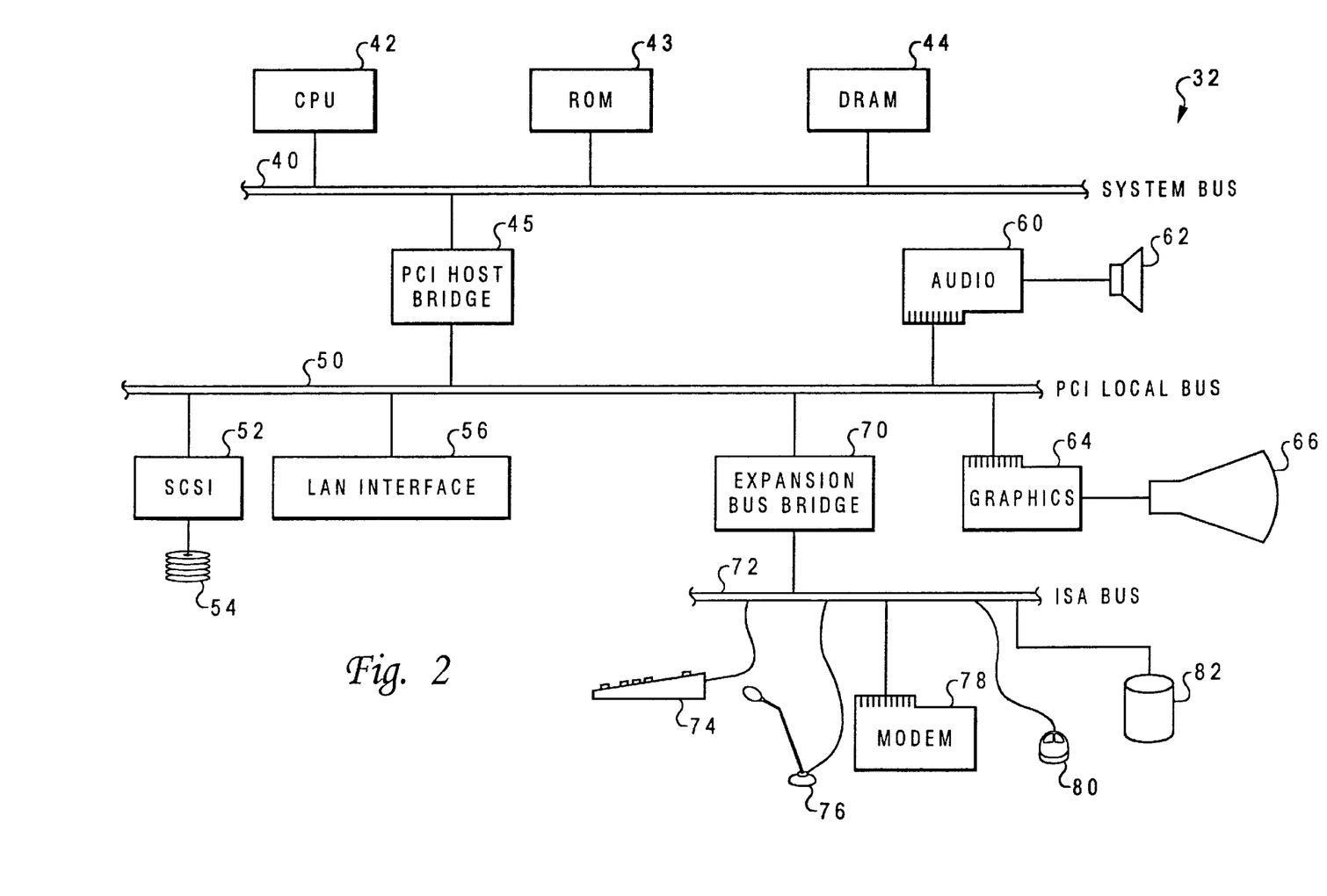
FIG. 2 illustrates an exemplary embodiment of a data presentation system with which the present invention may advantageously be utilized.

Referring now to FIG. 2, there is illustrated an exemplary embodiment of a client 32 in which client 32 comprises a multimedia personal computer system. As shown, client 32 has a system bus 40 connected to a central processing unit (CPU) 42, which executes software instructions and controls the operation of client 32, and read-only memory (ROM) 43 and dynamic random access memory (DRAM) 44, which provide storage for data and instructions that may be accessed by CPU 42. System bus 40 is coupled to PCI local bus 50 via Peripheral Component Interconnect (PCI) host bridge 45. PCI host bridge 45 provides both a low latency path through which CPU 42 may directly access PCI devices mapped to bus memory and/or I/O address spaces and a high bandwidth path through which PCI devices may directly access DRAM 44.

The PCI devices connected to PCI local bus 50 include Small Computer System Interface (SCSI) controller 52, which provides connections for multiple peripherals such as high speed SCSI disk drive 54, and Large Area Network (LAN) interface controller 56. LAN interface controller 56 handles network communication between client 32 and communications link 30 in an embodiment of environment 10 in which communications link 30 comprises a LAN or intranet. In order to present audio and video data to a user, client 32 is further equipped with a PCI-compatible audio controller 60 and graphics controller 64, which drive stereo speakers 62 and video display 66, respectively.

PCI bus 50 is further coupled to an expansion bus, such as ISA bus 72, via expansion bus bridge 70. Coupled to ISA bus 72 are a number of conventional input devices, such as keyboard 74, microphone 76 and mouse 80, as well as other peripherals, such as modem 78 and IDE hard disk 82. Modem 78 can be utilized to establish a connection with communications link 30 in an embodiment of environment 10 in which communications link 30 comprises the internet or World Wide Web. Importantly, audio and video data (e.g., movies, news broadcasts and music clips) received by client 32 from either communications link 30 or from another source can be stored by client 32 within non-volatile data storage (e.g., SCSI disk drive 54 or IDE hard disk 82) for subsequent presentation by presentation software running on client 32.

Figure 3:
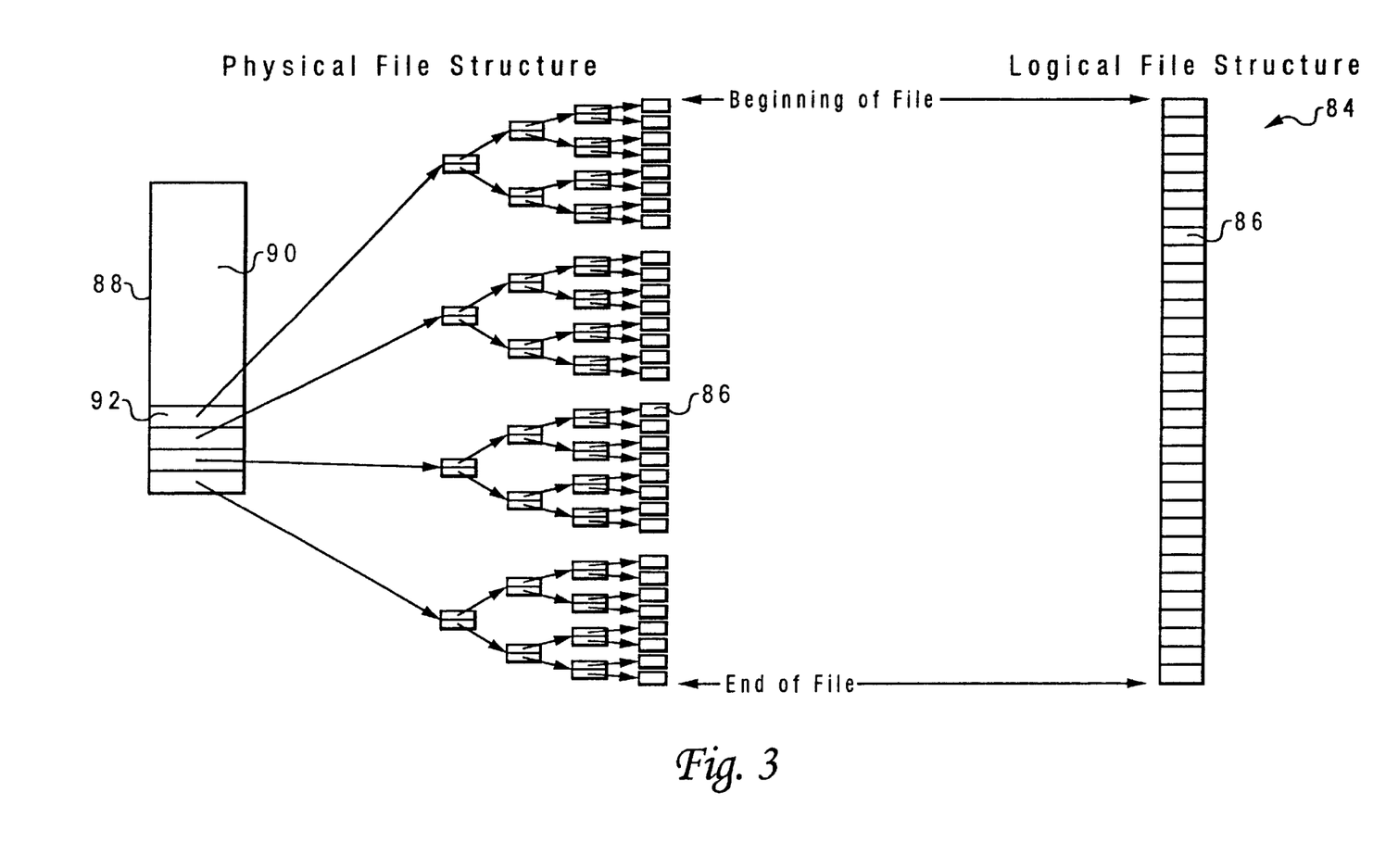
FIG. 3 depicts the physical and logical structures of an audio or video file.

With reference now to FIG. 3, the physical and logical structures of an audio or video file are illustrated. As indicated at reference numeral 84, a audio or video file can logically be viewed as a sequential series of contiguous data blocks 86. When the file is broadcast, data blocks 86 are transmitted serially and sequentially from the beginning of the file until the end of file (EOF) is reached.

When the file is stored on a physical non-volatile storage medium such as a disk 18 or SCSI hard drive 54, however, additional file-system-dependent information is stored in conjunction with the file data in order to permit the file data to be accessed. Although the format of such information may vary depending upon which physical medium and file system are utilized, the file system information typically takes the form of at least one inode 88, which, as that term is utilized herein, is defined as a file system data structure that describes the contents of a file. In the illustrated embodiment, inode 88 contains both header information 90 and one or more root pointers 92. Header information 90 specifies a number of different items of information, including the file owner, file type, file name, file access permissions, file size, file access times, etc. Root pointers 92 each indicate the physical location and logical ordering of data blocks that may be scattered in non-contiguous locations on the physical storage medium. In the illustrated embodiment, root pointers 92 do so by each pointing to the root node of a respective binary tree of pointers whose "leaf" pointers actually specify the physical location of individual data blocks. Although FIG. 3 depicts an embodiment in which the physical structure of a file includes only a single inode 88, it should be understood that in some file systems the physical file structure may include multiple inodes linked together by pointers.

Figure 4:
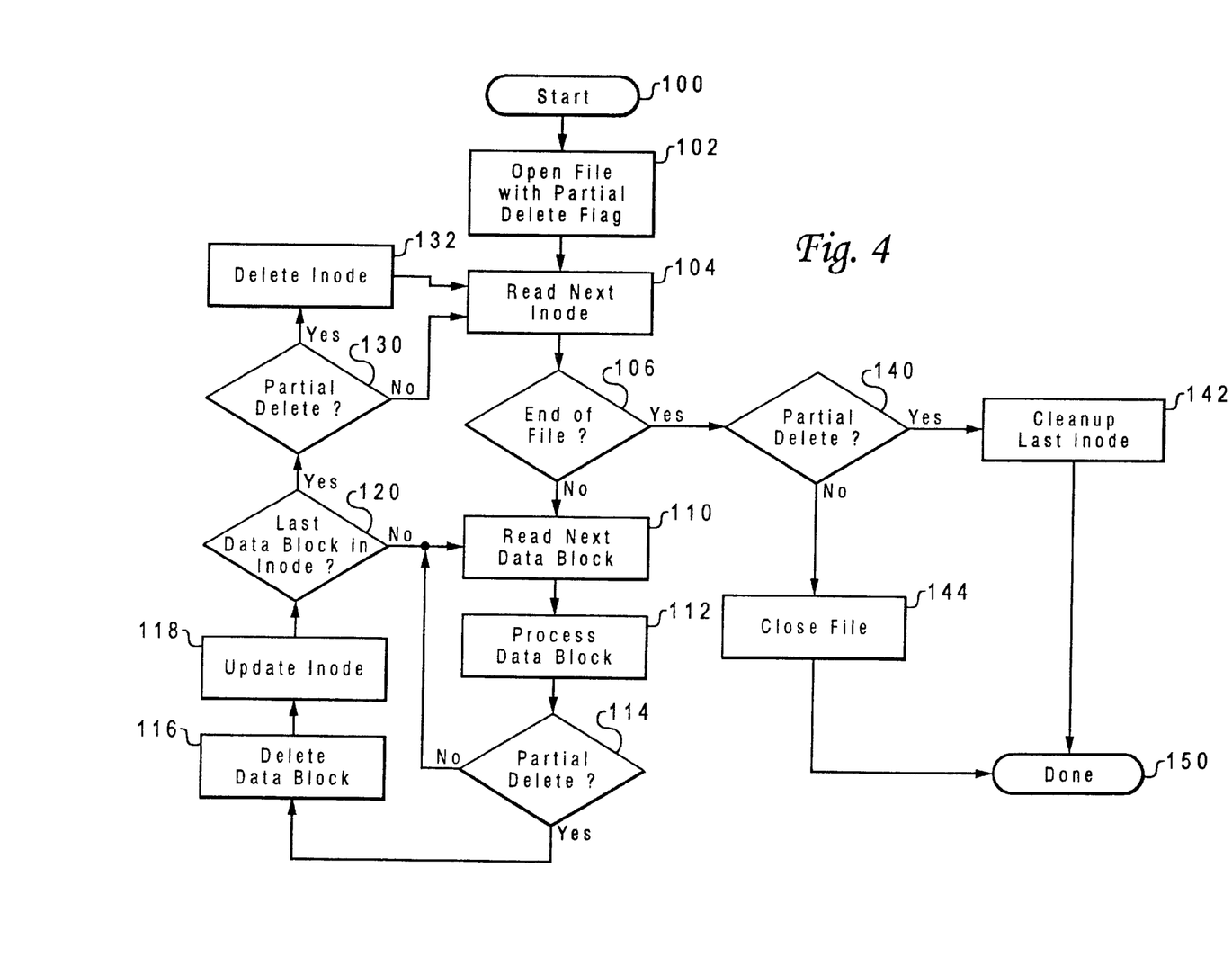
FIG. 4 is a logical flowchart illustrating a method for deleting a portion of the contents of an audio or video file prior to the broadcast or presentation of all of the contents of the file.

Referring now to FIG. 4, there is illustrated a logical flowchart of a method of managing the storage of an audio or video file within a non-volatile storage medium in accordance with the present invention. Importantly, the process illustrated in FIG. 4 can be implemented in both a broadcast environment (i.e., by audio-video server 12) and in a presentation environment (i.e., by client 32); however, for the sake of clarity, the process will first be described with reference to audio-video broadcast environment 10 of FIG. 1.

As depicted, the process begins at block 100 and thereafter proceeds to block 102, which illustrates the broadcast software executed by server controller 20 issuing an OPEN system call to the file system. Such system calls typically have a number of parameters, including the name of the file to be opened and access permissions indicating whether the access is read-only or read and write. In accordance with the present invention, the OPEN system call also includes a partial delete flag parameter, which is set to indicate that the file specified in the system call is to be deleted as it is read from the physical medium. In response to the OPEN system call, the file system instructs I/O adapter 22 to open the specified file in primary data store 14 for read/write access. The process then proceeds from block 102 to block 104, which depicts the file system reading the first (or next) inode, if any, of the file. A determination is then made at block 106 whether of not the EOF has been reached. If so, the process passes to block 140, which is described below. On the other hand, in response to a determination at block 106 that the EOF has not been reached, the process passes to block 110, which illustrates the file system reading the next block of data off of the physical medium. Next, as depicted at block 112, the data block is processed, for example, by encoding the data block utilizing encoder/decoder 24 and by broadcasting the data block via communications link 30.

Figure 5:
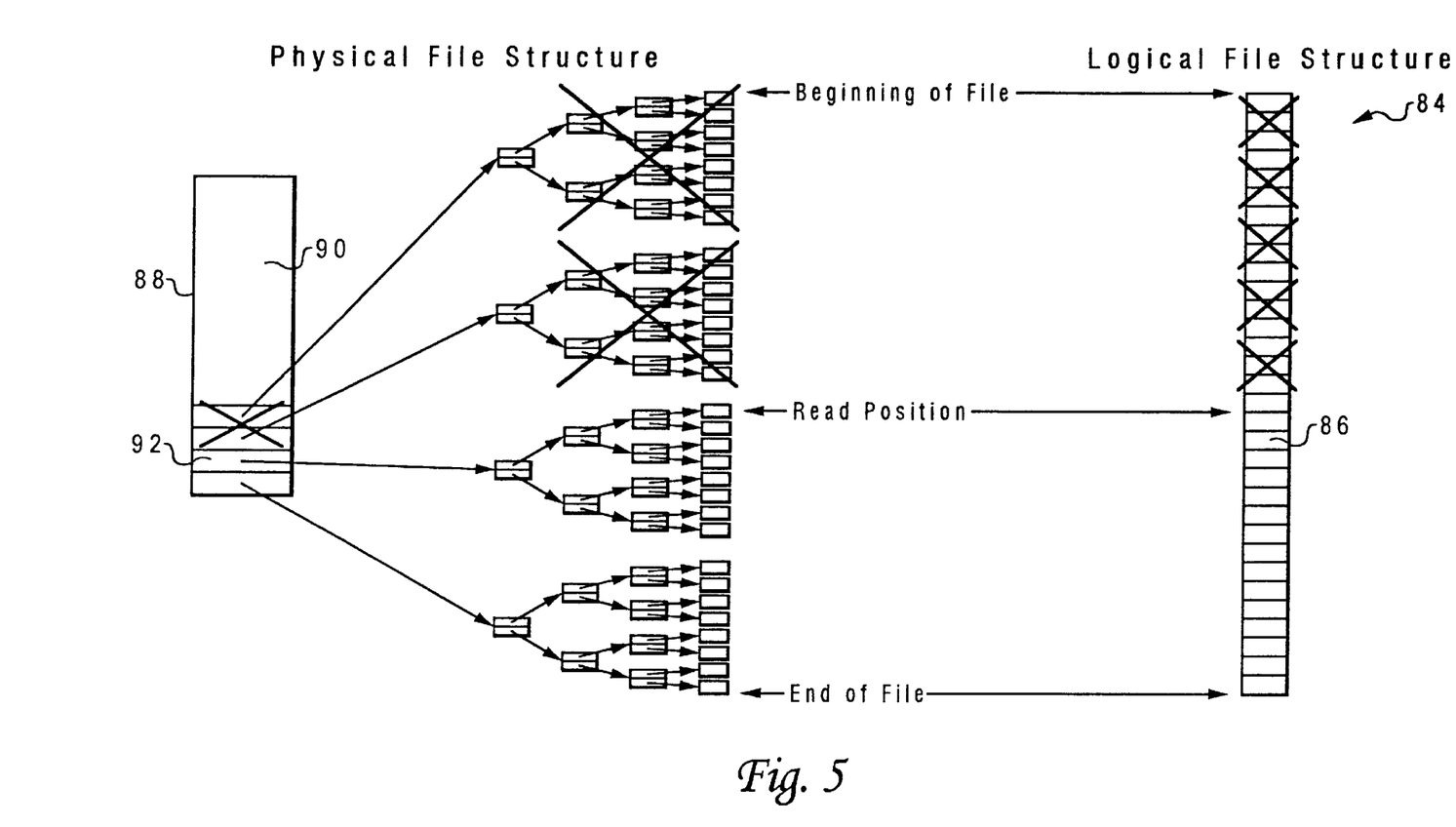
FIG. 5 depicts the deletion of a portion of the contents of an audio or video file prior to the broadcast or presentation of all of the file.

Next, a determination is made at block 114 whether or not the file was opened with the partial delete flag parameter set. If not, the process passes to block 120, which is described below. However, if the file was opened with the partial delete flag parameter set, the process proceeds to blocks 116 and 118. Blocks 116 and 118 depict the file system deleting the data block that was read at block 110 by overwriting the pointer to the data block with a null pointer. Thus, as illustrated in FIG. 5, after a data block has been read, all of the pointers to that data block that are not necessary to locate a logically subsequent data block are overwritten. Returning to block 120 of FIG. 4, a determination is then made of whether or not the deleted data block was the last data block in the current inode. If not, the process returns to block 110, which has been described. However., if the deleted data block was the last data block in the current inode, the process proceeds to block 130, which illustrates a determination of whether the file was opened with the partial delete flag parameter set. If not, the process simply returns to block 104, which has been described. However, if the file was opened with the partial delete flag parameter set, the current inode is deleted from the physical medium, as depicted at block 132, before the process returns to block 104.

Returning to block 104, if no more inodes remain to be read, a determination is then made at block 106 that the EOF has been reached. In response to the EOF determination, the process passes to block 140, which again illustrates a determination of whether or not the file was opened with the partial delete flag parameter set. If not, the file is closed, as depicted at block 144, and the process terminates at block 150. However, if the file was opened with the partial delete flag parameter set, the last inode is deleted and removed from any inode list the file system may keep, as shown at block 142, prior to the process terminating at block 150.

As should now be apparent, the process illustrated in FIG. 4 is also applicable to managing the storage of audio and video files within a data presentation environment. The only difference being that in a data presentation environment, block 112 of FIG. 4 represents the presentation of the data block to the user, rather than the encoding and broadcast of the data block. Because the large size of audio and video files places a premium on storage in a typical data presentation environment, the method of the present invention has particular applicability to operating scenarios in which the user desires to present (only once) a first file stored on the hard disk while concurrently downloading a second file from communications link 30 in the background. In this manner, contents of the second file may be stored in locations on the hard disk that were freed by the partial deletion of the first file during presentation.

As has been described, the present invention provides an improved method and system for managing the storage of audio and video files in broadcast and presentation environments. According to the present invention, portions of an audio or video file that have been broadcast or presented to a user can be deleted from non-volatile storage prior to completion of the broadcast or presentation of the file, thereby increasing the amount of available storage. This increase in the amount of available non-volatile storage can decrease the total storage capacity required in a particular broadcast or presentation environment, resulting in significant cost savings.

While the present invention has been shown and described with respect to various illustrative embodiments, it will be understood by those skilled in the art that various changes in form and detail may be made therein without departing from the spirit and scope of the invention. For example, although aspects of the present invention have been described with respect to specific "method steps" implementable on a computer systems, those skilled in the art will appreciated from the foregoing description that in an alternate embodiment the present invention may be implemented as a computer program product for use with a computer system. Those skilled in the art should readily appreciate that programs defining the functions of the present invention can be delivered to a computer via a variety of signal-bearing media, which include without limitation: (a) information permanently stored on non-writable storage media (e.g., CD-ROM); (b) information alterably stored on writable storage media (floppy diskettes or hard disk drives); or (c) information conveyed to a computer through communication media, such as through a computer or telephone network. It should be understood, therefore, that such signal-bearing media, when carrying computer readable instructions that direct the method functions of the present invention, represent alternative embodiments of the present invention.

What is claimed is:

1. An audio-video broadcast apparatus, comprising:

non-volatile data storage that stores a file that contains at least one of audio data and video data, wherein all of said file is concurrently stored within said non-volatile data storage prior to broadcast of contents of said file; and an audio-video server coupled to said non-volatile data storage, said audio-video server including:

means for broadcasting contents of said file; and means for causing said non-volatile storage to delete a portion of said file that has been broadcast from said non-volatile storage prior to said audio-video server broadcasting all of said contents of said file.

2. The audio-video broadcast apparatus of claim 1, wherein said non-volatile data storage comprises one or more data storage disks.

3. The audio-video broadcast apparatus of claim 1, wherein:

said file includes a plurality of data blocks that are all concurrently stored within said non-volatile data storage prior to broadcast of contents of said file; and said means for causing said non-volatile data storage to delete a portion of said file from said non-volatile data storage comprises means for causing said non-volatile data storage to delete one or more of said plurality of data blocks.

4. The audio-video broadcast apparatus of claim 1, said file containing both audio and video data.

5. The audio-video broadcast apparatus of claim 1, wherein said non-volatile data storage is a primary data store and said audio-video broadcast apparatus further comprises a secondary data store.

6. The audio-video broadcast apparatus of claim 1, said audio-video server further comprising means for encoding contents of said file prior to broadcasting said contents.

7. The audio-video broadcast apparatus of claim 6, wherein:

said means for broadcasting contents of said file comprises means for transmitting said contents of said file via an antenna;

said file is stored within said non-volatile storage in digital format; and said means for encoding comprising means for converting said contents of said file from digital format to analog format.

8. The audio-video broadcast apparatus of claim 6, wherein:

said means for broadcasting contents of said file comprises means for transmitting said contents of said file via a communications network; and said means for encoding comprises means for encoding said contents of said file in accordance with a network protocol utilized to communicate data via said communications network.

9. A data presentation system, comprising:

non-volatile data storage that stores a file that contains at least one of audio data and video data, wherein all of said file is concurrently stored within said non-volatile data storage prior to presentation of contents of said file;

a presentation device;

means for causing said presentation device to present contents of said file; and means for causing said non-volatile storage to delete a portion of said file that has been presented from said non-volatile storage prior to said presentation device presenting all of said contents of said file.

10. The data presentation apparatus of claim 9, said data presentation apparatus comprising a personal computer system.

11. The data presentation apparatus of claim 9, wherein said non-volatile data storage comprises one or more data storage disks.

12. The data presentation system of claim 9, wherein:

said file includes a plurality of data blocks that are all concurrently stored within said non-volatile data storage prior to broadcast of contents of said file; and said means for causing said non-volatile storage to delete a portion of said file from said non-volatile storage comprises means for causing said non-volatile storage to delete one or more of said plurality of data blocks.

13. The data presentation system of claim 9, said file containing both audio and video data.

14. The data presentation apparatus of claim 9, said presentation device comprising an audio presentation device.

15. The data presentation device of claim 9, said data presentation device comprising a video presentation device.

16. The data presentation device of claim 9, wherein said file is a first file, said data presentation device further comprising a communications adapter, connectable to a communications link, for receiving a second file containing at least one of audio and video from said communications link.

17. The data presentation device of claim 16, said second file being received during presentation of said contents of said first file, wherein said data presentation device stores at least some contents of said second file in one or more locations within said non-volatile storage that stored said portion of said first file prior to deletion of said portion of said first file.

18. A program product for use with an audio-video broadcast apparatus having non-volatile data storage that contains a file including at least one of audio data and video data, said computer program product comprising:

an audio-video server program for broadcasting contents of a file that are all concurrently stored within the non-volatile data storage prior to broadcast, and for causing said non-volatile data storage to delete a portion of said file that has been broadcast from said non-volatile data storage prior to said audio-video server broadcasting all of said contents of said file; and a signal-bearing medium bearing said audio-video server program.

19. The program product of claim 18, said audio-video server program further comprising means for encoding contents of said file prior to broadcasting said contents.

20. The program product of claim 19, wherein:

said audio-video server program broadcasts contents of said file via an antenna;

said file is stored within said non-volatile storage in digital format; and said means for encoding comprising means for converting said contents of said file from digital format to analog format.

21. The program product of claim 19, wherein:

said audio-video server broadcasts said contents of said file via a communications network; and said means for encoding comprises means for encoding said contents of said file in accordance with a network protocol utilized to communicate data via said communications network.

22. A method of managing the storage of a file in a broadcast environment, said method comprising:

within non-volatile data storage, storing a file that contains at least one of audio data and video data, wherein all of said file is concurrently stored within said non-volatile data storage prior to broadcast of contents of said file;

broadcasting contents of said file via a communications link; and deleting a portion of said file that has been broadcast from said non-volatile data storage prior to broadcasting all of said contents of said file.

23. A method of managing the storage of a file in a presentation environment, said method comprising:

within non-volatile data storage, storing a file that contains at least one of audio data and video data, wherein all of said file is concurrently stored within said non-volatile data storage prior to presentation of contents of said file;

presenting contents of said file; and deleting a portion of said file that has been presented from said non-volatile storage prior to presenting all of said contents of said file.

24. The audio-video broadcast apparatus of claim 3, wherein:

said file includes one or more inodes and each data block within said file is logically associated with a respective one of said one or more inodes; and said means for causing said non-volatile data storage to delete one or more of said plurality of data blocks further comprises means for causing said non-volatile data storage to deleting an inode from said file in said non-volatile data storage after all data blocks associated with said inode have been deleted and prior to broadcast of all of said contents of said file.

25. The data presentation system of claim 12, wherein:

said file includes one or more inodes and each data block within said file is logically associated with a respective one of said one or more inodes; and said means for causing said non-volatile data storage to delete one or more of said plurality of data blocks further comprises means for causing said non-volatile data storage to deleting an inode from said file in said non-volatile data storage after all data blocks associated with said inode have been deleted and prior to presentation all of said contents of said file.

26. The program product of claim 18, wherein:

said file includes a plurality of data blocks that are each logically associated with a respective one of one or more inodes within said file; and said audio-video server program includes instructions that cause an inode to be deleted from said file in said non-volatile data storage after all data blocks associated with said inode have been deleted and prior to broadcasting all of said contents of said file.

27. The method of claim 23, wherein:

said file includes a plurality of data blocks that are each logically associated with a respective one of one or more inodes within said file; and said method further comprises deleting an inode from said file in said non-volatile data storage after all data blocks associated with said inode have been deleted and prior to presenting all of said contents of said file.

* * * * *